(12) United States Patent  
Chen

(10) Patent No.: US 11,798,234 B2  
(45) Date of Patent: Oct. 24, 2023

(54) INTERACTION METHOD IN VIRTUAL REALITY SCENARIO AND APPARATUS

(71) Applicant: Huawei Technologies Co., Ltd., Shenzhen (CN)

(72) Inventor: Yilin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/624,682

(22) PCT Filed: Jul. 16, 2020

(86) PCT No.: PCT/CN2020/102415  
§ 371 (c)(1),  
(2) Date: Jan. 4, 2022

(87) PCT Pub. No.: WO2021/013043  
PCT Pub. Date: Jan. 28, 2021

(65) Prior Publication Data  
US 2022/0262074 A1 Aug. 18, 2022

(30) Foreign Application Priority Data  
Jul. 19, 2019 (CN) .......................... 201910654663.8

(51) Int. Cl.  
*G06T 19/00* (2011.01)  
*G06F 3/01* (2006.01)

(52) U.S. Cl.  
CPC .............. *G06T 19/00* (2013.01); *G06F 3/011* (2013.01); *G06T 2210/21* (2013.01)

(58) Field of Classification Search  
CPC ...... G06T 19/00; G06T 2210/21; G06F 3/011  
See application file for complete search history.

(56) References Cited

U.S. PATENT DOCUMENTS

| 5,900,849 A | 5/1999 | Gallery |
| 7,695,367 B2 | 4/2010 | Moro et al. |
| 2009/0102845 A1* | 4/2009 | Takemoto ............. G06T 19/006 345/426 |
| 2013/0093788 A1* | 4/2013 | Liu ...................... G01C 21/365 345/633 |
| 2013/0208004 A1 | 8/2013 | Hamada |

(Continued)

FOREIGN PATENT DOCUMENTS

| CN | 103105993 A | 5/2013 |
| CN | 103246351 A | 8/2013 |

(Continued)

*Primary Examiner* — Terrell M Robinson  
(74) *Attorney, Agent, or Firm* — Conley Rose, P.C.

(57) ABSTRACT

An interaction method applied to virtual reality (VR). When providing a virtual environment using a VR technology, an electronic device determines whether a virtual mapping object of a virtual object and a real object overlap in a real environment, and when the virtual mapping object and the real object overlap, prompts a user that there is currently an overlapping area, and performs interaction failure processing on the overlapping area. The user can be prevented from colliding with the real object in the real environment, to ensure user safety. In addition, an interaction operation between the user and the virtual environment is not interrupted.

20 Claims, 7 Drawing Sheets

(56) References Cited

U.S. PATENT DOCUMENTS

| | | | |
|---|---|---|---|
| 2013/0250078 A1* | 9/2013 | Levy | G01C 21/20 348/62 |
| 2013/0328928 A1 | 12/2013 | Yamagishi et al. | |
| 2013/0335301 A1* | 12/2013 | Wong | G06V 20/10 345/8 |
| 2014/0225812 A1* | 8/2014 | Hosoya | G02B 27/0093 345/8 |
| 2015/0187142 A1 | 7/2015 | Zhang et al. | |
| 2016/0033770 A1 | 2/2016 | Fujimaki et al. | |
| 2016/0217612 A1 | 7/2016 | Petill et al. | |
| 2017/0270707 A1 | 9/2017 | Kass | |
| 2017/0337750 A1 | 11/2017 | McKenzie et al. | |
| 2017/0372499 A1 | 12/2017 | Lalonde | |
| 2018/0032304 A1 | 2/2018 | Lin et al. | |
| 2018/0075658 A1 | 3/2018 | Lanier et al. | |
| 2018/0101223 A1 | 4/2018 | Ishihara et al. | |
| 2018/0117470 A1 | 5/2018 | Chiu | |
| 2018/0122043 A1 | 5/2018 | Energin et al. | |

FOREIGN PATENT DOCUMENTS

| | | | | |
|---|---|---|---|---|
| CN | 103246543 A | | 8/2013 | |
| CN | 103480154 A | | 1/2014 | |
| CN | 104216520 A | | 12/2014 | |
| CN | 105739125 A | | 7/2016 | |
| CN | 106155326 A | | 11/2016 | |
| CN | 106445176 A | | 2/2017 | |
| CN | 106652345 A | | 5/2017 | |
| CN | 106873775 A | | 6/2017 | |
| CN | 107209570 A | | 9/2017 | |
| CN | 108614635 A | * | 10/2018 | ............... G06F 3/01 |
| CN | 108614635 A | | 10/2018 | |
| CN | 108633307 A | | 10/2018 | |
| CN | 108885488 A | | 11/2018 | |
| CN | 108922115 A | | 11/2018 | |
| CN | 109782909 A | | 5/2019 | |
| CN | 109803734 A | | 5/2019 | |
| EP | 2720115 A2 | | 4/2014 | |
| JP | 2015118442 A | * | 6/2015 | ............... G06F 3/01 |
| WO | 2015093130 A1 | | 6/2015 | |

\* cited by examiner

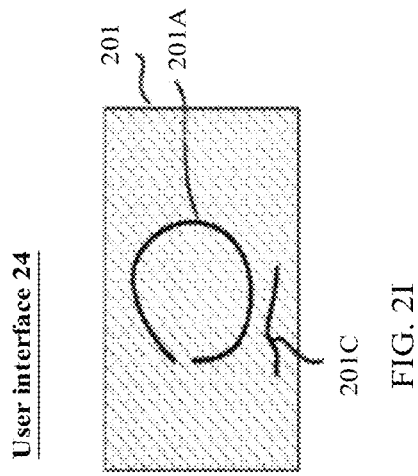
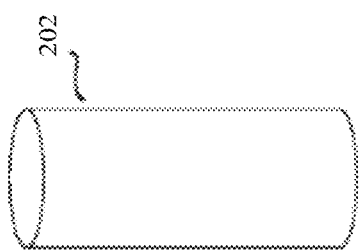
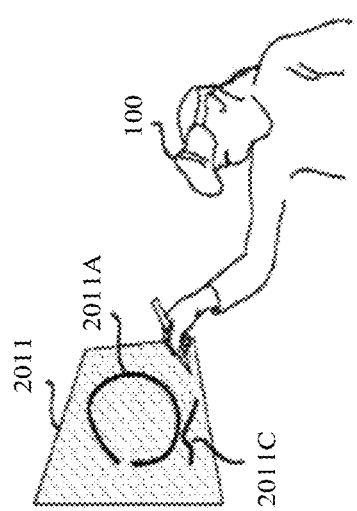

INTERACTION METHOD IN VIRTUAL REALITY SCENARIO AND APPARATUS

CROSS-REFERENCE TO RELATED APPLICATIONS

This is a National Stage of International Patent Application No. PCT/CN2020/102415 filed on Jul. 16, 2020, which claims priority to Chinese Patent Application No. 201910654663.8 filed on Jul. 19, 2019. Both of the aforementioned applications are hereby incorporated by reference in their entireties.

TECHNICAL FIELD

This application relates to the field of virtual reality (virtual reality, VR) and terminal technologies, and in particular, to an interaction method in a virtual reality scenario and an apparatus.

BACKGROUND

With development of computer graphics technologies, a VR technology is gradually applied to people's life. In VR, a three-dimensional virtual world is simulated by using an electronic device, to provide visual, auditory, tactile, or other sensory simulation experience, so that a user feels immersive. In addition, the user may further interact with the simulated virtual world.

In a VR scenario, the user can see the simulated virtual world, but cannot see a real external environment, which poses some potential safety risks. The user cannot sense the real environment, and therefore during interaction with the virtual world, the body of the user may directly touch an object in the real environment. For example, the user may collide with a wall or a vehicle, leaving the user in danger. Therefore, a technical solution needs to be provided to enable the user to safely interact with the virtual world in the VR scenario, to avoid a potential safety risk.

SUMMARY

Embodiments of this application provide an interaction method in a virtual reality scenario and an apparatus, to prevent a user from colliding with a real object in a real environment, so as to ensure user safety. In addition, according to the method provided in the embodiments of this application, an interaction operation between the user and a virtual environment is not interrupted, and therefore immersive experience is provided for the user, thereby improving user experience of an electronic device.

According to a first aspect, an embodiment of this application provides an interaction method in a virtual reality scenario. The method is applied to an electronic device. The method may include: The electronic device displays a virtual object by using a display apparatus; the electronic device determines whether a virtual mapping object and a real object overlap, wherein the virtual mapping object is obtained after the virtual object is mapped to a real environment; and the electronic device performs the following steps in response to a determining result of overlapping between the virtual mapping object and the real object: outputting a first prompt information, where the first prompt information is used to indicate that the virtual mapping object and the real object overlap; continuously displaying the virtual object; and stopping detecting an operation that acts on an overlapping area of the virtual mapping object and the real object, or when the electronic device detects an operation that acts on an overlapping area of the virtual mapping object and the real object, skipping responding to the operation.

In the method in the first aspect, the electronic device is configured to provide a virtual display scenario. The electronic device may be a pair of VR glasses, a VR head-mounted display (head-mounted display, HMD), a VR all-in-one machine, or the like.

In implementation of the method in the first aspect, the first prompt information output by the electronic device may be used to prevent a user from colliding with the real object in the real environment, to ensure user safety. In addition, when the virtual mapping object of the virtual object in the real environment and the real object in the real environment overlap, the electronic device still continuously provides the virtual reality scenario. In this way, it can be ensured that interaction between the user and the electronic device is not interrupted, and therefore continuous immersive experience is provided for the user, to achieve a better virtual reality effect.

With reference to the first aspect, in some embodiments, the first prompt information is further used to indicate the overlapping area of the virtual mapping object and the real object. In this way, the user may learn of a location of the overlapping area of the virtual mapping object of the virtual object in the real environment and the real object in the real environment by using the first prompt information.

With reference to the first aspect, in some embodiments, the first prompt information includes one or more of the following: a visual element, a voice, an indicator feedback, or a vibration feedback. The visual element may include but is not limited to text or an icon displayed by using the display apparatus.

With reference to the first aspect, in some embodiments, the electronic device may display the overlapping area of the virtual mapping object and the real object in a preset effect, to output the first prompt information. The preset effect may include but is not limited to displaying the virtual mapping object in the overlapping area by using a dashed line, displaying the virtual mapping object in the overlapping area in a relatively light color, highlighting the virtual mapping object in the overlapping area, displaying the virtual mapping object in the overlapping area in a translucent manner, or stopping displaying the virtual mapping object in the overlapping area.

With reference to the first aspect, in some embodiments, the electronic device may obtain spatial information of the virtual object and spatial information of the real object, and determine, based on the spatial information of the virtual object and the spatial information of the real object, whether the virtual mapping object and the real object overlap.

The spatial information of the real object includes one or more of the following: a distance between the real object and the electronic device, an orientation of the real object relative to the electronic device, and a shape or a size of the real object.

The spatial information of the virtual object includes one or more of the following: a distance between the virtual mapping object of the virtual object in the real environment and the electronic device, an orientation of the virtual mapping object of the virtual object in the real environment relative to the electronic device, and a shape or a size of the virtual mapping object of the virtual object in the real environment.

With reference to the first aspect, in some embodiments, the electronic device may determine, by performing the following steps, whether the virtual mapping object of the virtual object in the real environment and the real object in the real environment overlap: The electronic device establishes a three-dimensional coordinate system; the electronic device determines, in the three-dimensional coordinate system, whether a distance between the virtual mapping object and the real object is less than or equal to 0; and when the distance between the virtual mapping object and the real object is less than or equal to 0, the electronic device determines that the virtual mapping object and the real object overlap; or when the distance between the virtual mapping object and the real object is greater than 0, the electronic device determines that the virtual mapping object and the real object do not overlap.

Herein, the three-dimensional coordinate system may be a geodetic coordinate system, a three-dimensional coordinate system whose point of origin is a location of the user/the electronic device 100, or another three-dimensional coordinate system. This is not limited in this application.

With reference to the first aspect, in some embodiments, the electronic device may determine, in any one of the following cases, whether the virtual mapping object of the virtual object in the real environment and the real object in the real environment overlap:

1. A case in which the electronic device runs a first application program. Herein, in a virtual reality scenario provided when the electronic device runs the first application program, the user needs to frequently interact with the virtual object, and the user is very likely to move. The first application program may be, for example, a motion sensing game application program.
2. A case in which a preset period arrives. Specifically, the electronic device may perform the determining operation based on the preset period.
3. A case in which the electronic device identifies that the user is currently outdoors. Specifically, the user is much safer indoors than outdoors, and the user is more likely to touch the real object in the real outdoor environment. In this way, the user can be effectively prevented from touching the real object.

With reference to the first aspect, in some embodiments, the electronic device may further direct the user to perform effective interaction with the virtual object. Specifically, the electronic device may direct the user to eliminate the overlapping area, so that the virtual mapping object of the virtual object and the real object no longer overlap. After the overlapping area is eliminated, all virtual objects in the virtual environment may perform effective interaction with the user. Effective interaction means that the electronic device may make a corresponding feedback in response to an operation performed on the virtual object.

In this embodiment of this application, a manner of directing the user to perform effective interaction varies with a manner of providing the virtual environment by the electronic device. The following lists two possible manners of directing, when the electronic device provides the virtual environment in different manners, the user to perform effective interaction:

1. The electronic device is mounted on the head of the user, and when the electronic device moves, a location of the virtual mapping object of the virtual object in the real environment relative to the electronic device is kept unchanged. When the electronic device provides the virtual environment in the manner 1, in response to the determining result of overlapping between the virtual mapping object and the real object, the electronic device outputs second prompt information. The second prompt information is used to indicate the user to turn to a first direction or move to a first location, so that the virtual mapping object and the real object do not overlap.

When providing the virtual environment in the manner 1, the electronic device may establish a space model in the three-dimensional coordinate system based on the spatial information of the real object and the spatial information of the virtual object, determine a direction that the user faces and in which the real object and the virtual mapping object of the virtual object do not overlap or a location at which the user is located and at which the real object and the virtual mapping object of the virtual object do not overlap, use the direction as the first direction, and use the location as the first location.

2. The electronic device is mounted on the head of the user, and when the electronic device moves, a location of the virtual mapping object of the virtual object in the real environment relative to the real object is kept unchanged. When the electronic device provides the virtual environment in the manner 2, in response to the determining result of overlapping between the virtual mapping object and the real object, the electronic device outputs third prompt information. The third prompt information is used to indicate the user to trigger, after turning to a second direction or moving to a second location, the electronic device to display the virtual object again by using the display apparatus, so that the virtual mapping object and the real object do not overlap.

When providing the virtual environment in the manner 2, the electronic device may establish a space model in the three-dimensional coordinate system based on the spatial information of the real object and the spatial information of the virtual object, determine a direction that the user faces and in which the real object and the virtual mapping object of the virtual object do not overlap or a location at which the user is located and at which the real object and the virtual mapping object of the virtual object do not overlap, use the direction as the second direction, and use the location as the second location.

With reference to the first aspect, the electronic device may display the virtual object in any one of the following manners: 1. In some embodiments, the display apparatus is a display screen, and the electronic device displays the virtual object on the display screen. 2. In some other embodiments, the display apparatus includes an optical apparatus, and the electronic device projects an optical signal corresponding to the virtual object by using the optical apparatus.

According to a second aspect, an embodiment of this application provides an interaction method in a virtual reality scenario. The method is applied to a virtual reality display apparatus. The method may include:

The virtual reality display apparatus displays a virtual object by using a display apparatus;

the virtual reality display apparatus determines, based on obtained spatial information of the virtual object and obtained spatial information of a real object, whether a virtual mapping object obtained after the virtual object is mapped to a real environment and the real object overlap; and the virtual reality display apparatus performs the following steps in response to a determining result of overlapping between the virtual mapping object and the real object: outputting first prompt information, where the first prompt information is used to indicate that the virtual mapping object and the real object overlap;

continuously displaying the virtual object; and stopping detecting an operation that acts on an overlapping area of the virtual mapping object and the real object, or when the virtual reality display apparatus detects an operation that acts on an overlapping area of the virtual mapping object and the real object, skipping responding, by the virtual reality display apparatus, to the operation.

The spatial information of the real object includes one or more of the following: a distance between the real object and the virtual reality display apparatus, an orientation of the real object relative to the virtual reality display apparatus, or a shape or a size of the real object.

The spatial information of the virtual object includes one or more of the following: a distance between the virtual mapping object and the virtual reality display apparatus, an orientation of the virtual mapping object relative to the virtual reality display apparatus, or a shape or a size of the virtual mapping object.

In implementation of the method in the second aspect, the first prompt information output by the virtual reality display device may be used to prevent a user from colliding with the real object in the real environment, to ensure user safety. In addition, when the virtual mapping object of the virtual object in the real environment and the real object in the real environment overlap, the virtual reality display device still continuously provides a virtual reality scenario. In this way, it can be ensured that interaction between the user and the virtual reality display device is not interrupted, and therefore continuous immersive experience is provided for the user, to achieve a better virtual reality effect.

Based on a same inventive concept, for the interaction method in the virtual reality scenario in the second aspect and beneficial effects, refer to the first aspect, the possible method implementations of the first aspect, and brought beneficial effects. Therefore, for implementation of the interaction method in the virtual reality scenario, refer to the first aspect and the possible method implementations of the first aspect. No repeated description is provided.

According to third aspect, an embodiment of this application provides a graphical user interface on an electronic device. The electronic device includes a display apparatus, a memory, and one or more processors. The one or more processors are configured to execute one or more computer programs stored in the memory. The graphical user interface includes: displaying a virtual object; outputting first prompt information in response to a determining result of overlapping between a virtual mapping object obtained after the virtual object is mapped to a real environment and a real object, where the first prompt information is used to indicate that the virtual mapping object and the real object overlap; continuously displaying the virtual object in response to the determining result of overlapping between the virtual mapping object and the real object; and further outputting second prompt information in response to the determining result of overlapping between the virtual mapping object and the real object, where the second prompt information is used to indicate a first direction or a first location, to direct a user to turn to the first direction or move to the first location, so that the virtual mapping object and the real object do not overlap.

Based on a same inventive concept, for the graphical user interface of the second aspect and beneficial effects of the graphical user interface, refer to the first aspect, the possible method implementations of the first aspect, and brought beneficial effects. Therefore, for implementation of the graphical user interface, refer to the first aspect and the possible method implementations of the first aspect. Details are not described herein again.

According to fourth aspect, an embodiment of this application provides a graphical user interface on a virtual reality display device. The virtual reality display device includes a display apparatus, a memory, and one or more processors. The one or more processors are configured to execute one or more computer programs stored in the memory. The graphical user interface includes: displaying a virtual object by using the display apparatus; outputting first prompt information in response to a determining result of overlapping between a virtual mapping object obtained after the virtual object is mapped to a real environment and a real object, where the first prompt information is used to indicate that the virtual mapping object and the real object overlap; continuously displaying the virtual object in response to the determining result of overlapping between the virtual mapping object and the real object; and further outputting second prompt information in response to the determining result of overlapping between the virtual mapping object and the real object, where the second prompt information is used to indicate a first direction or a first location, to direct a user to turn to the first direction or move to the first location, so that the virtual mapping object and the real object do not overlap.

Based on a same inventive concept, for the graphical user interface in the fourth aspect and beneficial effects, refer to the second aspect, the possible method implementations of the second aspect, and brought beneficial effects. Therefore, for implementation of the graphical user interface, refer to the second aspect and the possible method implementations of the second aspect. No repeated description is provided.

According to a fifth aspect, an embodiment of this application provides an electronic device. The electronic device is configured to perform the method in the first aspect. The electronic device includes one or more processors, a memory, and a display apparatus. The memory is coupled to the one or more processors. The memory is configured to store computer program code. The computer program code includes computer instructions, and the one or more processors invoke the computer instructions, so that the electronic device performs the method in any one of the first aspect or the possible implementations of the first aspect. Therefore, for an operation performed by the electronic device in the fifth aspect and beneficial effects brought by the electronic device, refer to related description in any one of the first aspect or the possible implementations of the first aspect. Details are not described herein.

According to a sixth aspect, an embodiment of this application provides a virtual reality display device. The virtual reality display device is configured to perform the method in the second aspect. The virtual reality display device includes one or more processors, a memory, and a display apparatus. The memory is coupled to the one or more processors. The memory is configured to store computer program code. The computer program code includes computer instructions, and the one or more processors invoke the computer instructions, so that the virtual reality display device performs the method in any one of the second aspect or the possible implementations of the second aspect. Therefore, for an operation performed by the virtual reality display device in the fifth aspect and beneficial effects brought by the virtual reality display device, refer to related description in any one of the second aspect or the possible implementations of the second aspect. Details are not described herein.

According to a seventh aspect, an embodiment of this application provides a computer program product that includes instructions. When the computer program product is run on an electronic device, the electronic device is enabled to perform the method in any one of the first aspect or the possible implementations of the first aspect.

According to an eighth aspect, an embodiment of this application provides a computer-readable storage medium, including instructions. When the instructions are run on an electronic device, the electronic device is enabled to perform the method according to any one of the first aspect or the possible implementations of the first aspect.

According to a ninth aspect, an embodiment of this application provides a computer program product including instructions. When the computer program product runs on an electronic device, the electronic device is enabled to perform the method according to any one of the second aspect or the possible implementations of the second aspect.

According to a tenth aspect, an embodiment of this application provides a computer-readable storage medium, including instructions. When the instructions are run on an electronic device, the electronic device is enabled to perform the method according to any one of the second aspect or the possible implementations of the second aspect.

In implementation of the technical solutions provided in the embodiments of this application, when providing the virtual environment by using a VR technology, the electronic device may determine whether the virtual mapping object of the virtual object and the real object overlap in the real environment, and if the virtual mapping object of the virtual object and the real object overlap in the real environment, the electronic device may prompt the user that there is currently an overlapping area, and perform interaction failure processing on the overlapping area.

In implementation of the technical solutions provided in embodiments of this application, the user can be prevented from colliding with the real object in the real environment, to ensure user safety. In addition, in the technical solutions provided in the embodiments of this application, an interaction operation between the user and the virtual environment is not interrupted, and therefore immersive experience is provided for the user, thereby improving user experience of the electronic device.

BRIEF DESCRIPTION OF DRAWINGS

FIG. 2A, FIG. 2E, FIG. 2G, and FIG. 2I are schematic diagrams of man-machine interaction according to an embodiment of this application; and FIG. 2B to FIG. 2D, FIG. 2F, FIG. 2H, and FIG. 3A to FIG. 3D are schematic diagrams of a virtual reality scenario according to an embodiment of this application.

DESCRIPTION OF EMBODIMENTS

Figure 1:
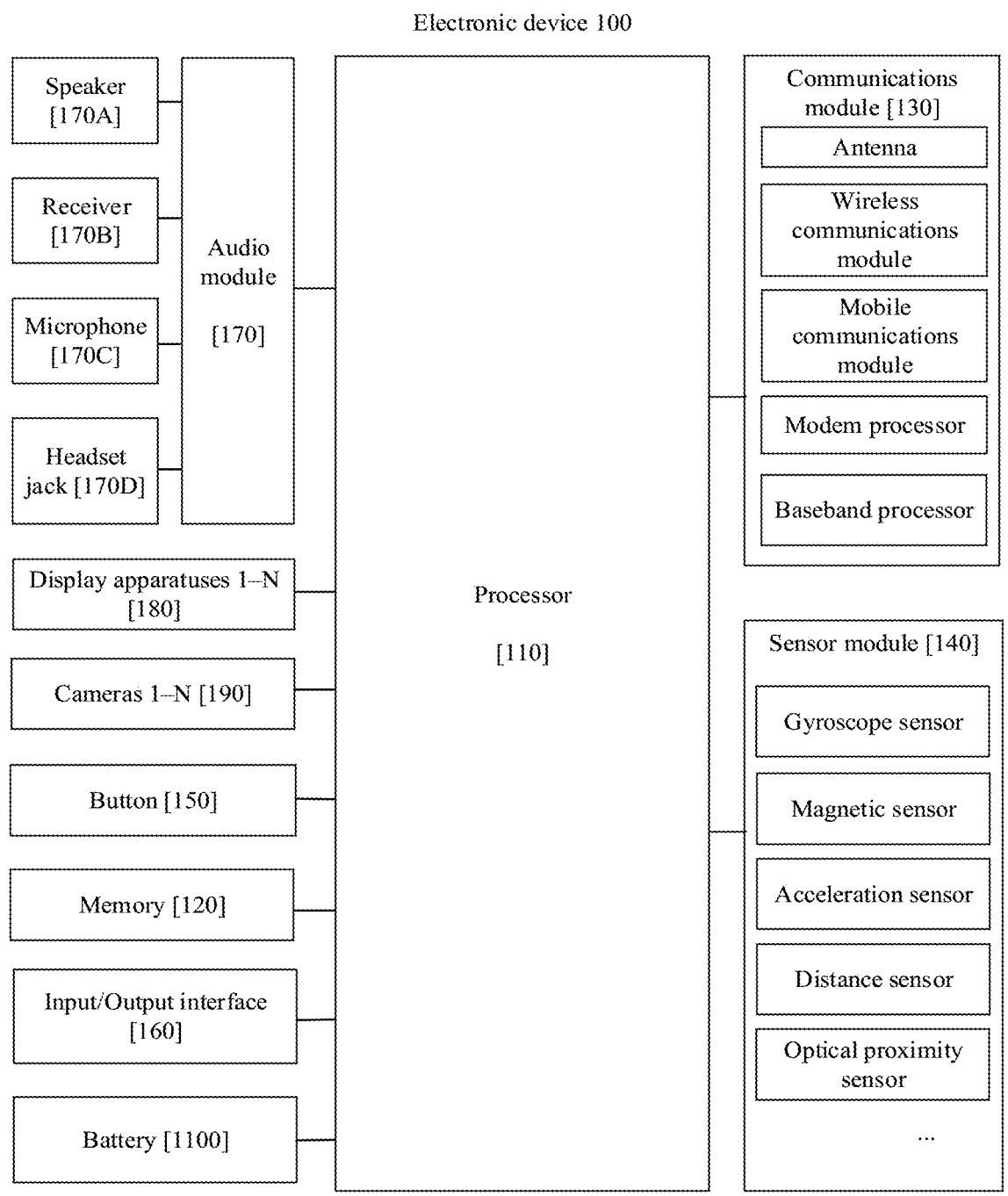
FIG. 1 is a schematic diagram of a structure of an electronic device according to an embodiment of this application.

The following describes the technical solutions in embodiments of this application with reference to the accompanying drawings in the embodiments of this application.

In descriptions of the embodiments of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, "a plurality of" means two or more than two unless otherwise specified.

The embodiments of this application provide an interaction method in a virtual reality scenario and an apparatus. When providing a virtual environment by using a VR technology, an electronic device may collect spatial information of a real object, and determine, based on the spatial information of the real object and spatial information of a virtual object, whether the virtual object and the real object overlap. If the virtual object and the real object overlap, the electronic device may prompt a user that the virtual object and the real object currently overlap, and perform interaction failure processing on an overlapping area. In implementation of the method provided in the embodiments of this application, based on a prompt of the electronic device, the user can be prevented from colliding with the real object in the real environment, to ensure user safety. In addition, according to the method provided in the embodiments of this application, an interaction operation between the user and a virtual environment is not interrupted, and therefore immersive experience is provided for the user, thereby improving user experience of the electronic device.

In the embodiments of this application, that an electronic device provides a virtual environment by using a VR technology means that the electronic device renders and displays one or more virtual objects by using a VR display technology. The virtual object may be generated by the electronic device by using a computer graphics technology, a computer simulation technology, or the like, or may be generated by another electronic device by using a computer graphics technology, a computer simulation technology, or the like and sent to the electronic device. The another electronic device may be a server, or may be a mobile phone, a computer, or the like that is connected to or paired with the electronic device. The virtual object may also be referred to as a virtual image or a virtual element. The virtual object may be two-dimensional or three-dimensional. The virtual object is a fake object instead of a real object in a physical world. The virtual object may be a virtual object that simulates an object in the real physical world, to provide immersive experience for the user. The virtual object may include a virtual animal, a virtual person, a virtual tree, a virtual building, a virtual label, icon, picture, or video, and the like.

In the following embodiments of this application, that an electronic device provides a virtual environment by using a VR technology may also be understood as that the electronic device provides a virtual reality scenario.

In the following embodiments of this application, the real environment is a real physical environment or real physical space in which the user and the electronic device are currently located. An object in the real environment is a real object. The real object may include an animal, a person, a tree, a building, and the like.

The spatial information of the real object is information that reflects a location and a shape of the real object and a spatial relationship of the real object in the real environment.

The spatial information of the real object may include but is not limited to information about a location of each real object relative to the user/the electronic device. The information about the location of the real object relative to the user/the electronic device may include a distance between each real object and the user/the electronic device in the real environment and an orientation (for example, being straight ahead, being behind, being on a left side, or being on a right side) of each real object relative to the user/the electronic device in the real environment. The distance between the real object and the user/the electronic device may be a distance between the real object and the face of the user. In the following embodiments of this application, the distance between the real object and the user/the electronic device is referred to as a depth (depth) of the real object. The spatial information of the real object may further include a size of the real object.

The spatial information of the virtual object is information that reflects a location and a shape of the virtual object and a spatial relationship of the virtual object in the virtual environment. The spatial information of the virtual object may include but is not limited to information about a location of each virtual object relative to the user/the electronic device. The information about the location of the virtual object relative to the user/the electronic device may include a depth (depth) of each virtual object in the virtual environment and an orientation of each virtual object relative to the user/the electronic device in the virtual environment. The spatial information of the virtual object may further include a size of the virtual object.

Specifically, the electronic device provides a virtual reality scenario for the user by displaying the virtual object on a display screen or projecting an optical signal onto a retina of the user, so that the user may sense a three-dimensional virtual environment. In the three-dimensional virtual environment, the virtual object is equivalent to being mapped to an actual real environment, and the user feels or considers that the virtual object appears to exist in the actual real environment. In the embodiments of this application, a virtual mapping object obtained after the virtual object is mapped to the real environment may be referred to as a virtual mapping object of the virtual object.

The depth of the virtual object refers to a distance between the virtual mapping object of the virtual object and a current location of the user after the electronic device maps the virtual object to the real environment. The orientation of the virtual object is an orientation of the virtual mapping object of the virtual object relative to the current location of the user after the electronic device maps the virtual object to the real environment. For example, after sensing the three-dimensional virtual environment, the user may move a hand towards the orientation of the virtual object by a specific distance, and after the movement distance reaches the depth of the virtual object, the user may touch the virtual mapping object obtained after the virtual object is mapped to the real environment. The shape and size of the virtual object are a shape and size of the virtual mapping object of the virtual object in the real environment after the electronic device maps the virtual object to the real environment.

In the embodiments of this application, both the real object and the virtual object may be 3D. There may be a different distance between a different part of the 3D real object and the user/the electronic device 100, and therefore one 3D real object may have a plurality of depths. Similarly, there may be a different distance between a different part of the 3D virtual object and the user/the electronic device 100, and therefore one 3D virtual object may also have a plurality of depths.

In the following embodiments of this application, that the real object and the virtual object overlap means that after the electronic device maps the virtual object to the real environment, the virtual mapping object of the virtual object and the real object overlap in the real environment. Further, when a distance between the virtual mapping object of the virtual object and the real object is less than or equal to 0, the virtual mapping object of the virtual object and the real object overlap in the real environment.

In the following embodiments of this application, an area in which the real object and the virtual object overlap may be referred to as an overlapping area.

In the following embodiments of this application, after the electronic device performs interaction failure processing on the overlapping area, the electronic device no longer makes a corresponding feedback in response to an operation performed on the virtual mapping object of the virtual object in the overlapping area. That is, after performing interaction failure processing, the electronic device still continuously provides the virtual environment. That is, the electronic device still continuously displays the virtual object in the overlapping area, but the user can no longer interact with some virtual objects in the virtual environment. Herein, the electronic device continuously provides the virtual scenario, so that immersive experience of the user in the virtual environment may not be interrupted.

The following first describes the electronic device provided in the embodiments of this application.

The virtual object displayed by the electronic device may interact with the user. In some embodiments, the user may directly interact, in a motion sensing interaction manner such as hand/arm movement, head movement, or eyeball movement, with the virtual object displayed by the electronic device. In some other embodiments, the electronic device may be used together with a handheld device, and the user may interact, by controlling the handheld device, with the virtual object displayed by the electronic device. The handheld device may be, for example, a controller, a gyro mouse, a stylus, or another handheld computing device. The handheld device may be configured with a plurality of sensors, such as an acceleration sensor, a gyroscope sensor, a magnetic sensor, and may be configured to detect and track movement of the handheld device. The handheld device may communicate with the electronic device by using a short-distance transmission technology such as Bluetooth (bluetooth), near field communication (near field communication, NFC), or ZigBee.

The electronic device may be mounted on the head of the user. For example, the electronic device may be a virtual reality display device such as a pair of VR glasses, a VR head-mounted display (head-mounted display, HMD), or a VR all-in-one machine. In some other embodiments of this application, the electronic device may alternatively be a non-portable electronic device such as a desktop computer that supports the VR technology, a smart television, or a vehicle that includes a display screen. In the embodiments of this application, a distance between the electronic device and the user approximates 0, and therefore it may be considered that a location of the electronic device is the same as that of the user.

FIG. 1 is a schematic diagram of a structure of an example of an electronic device 100 according to this application.

As shown in FIG. 1, the electronic device 100 may include a processor 110, a memory 120, a communications module 130, a sensor module 140, a button 150, an input/output interface 160, an audio module 170, a speaker 170A, a receiver 170B, a microphone 170C, a headset jack 170D, a display apparatus 180, a camera 190, a battery 1100, and the like.

It may be understood that a structure shown in this embodiment of this application does not constitute a specific limitation on the electronic device. In some other embodiments of this application, the electronic device may include more or fewer components than those shown in the figure. For example, the electronic device 100 may further include an infrared transceiver apparatus, an ultrasonic transceiver device, a motor, and a flash. Alternatively, some components may be combined, some components may be split, or there may be different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a video processing unit (video processing unit, VPU) controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) port, a serial peripheral interface (serial peripheral interface, SPI) interface, and the like.

The I2C interface is a two-way synchronization serial bus, and includes a serial data line (serial data line, SDA) and a serial clock line (serial clock line, SCL). In some embodiments, the processor 110 may include a plurality of groups of I2S buses. The processor 110 may be separately coupled to a touch sensor, a charger, the camera 190, and the like through different I2C bus interfaces.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to a wireless communications module through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communications module through a PCM bus interface. In some embodiments, the audio module 170 may alternatively transmit an audio signal to the wireless communications module in the communications module 130 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the communication module 130. For example, the processor 110 communicates with a Bluetooth module in the communication module 130 through the UART interface, to implement a Bluetooth function.

The MIPI interface may be configured to connect the processor 110 to a peripheral component such as the display apparatus 180 or the camera 190. The MIPI interface includes a camera serial interface (camera serial interface, CSI), a display serial interface (display serial interface, DSI), and the like. In some embodiments, the processor 110 communicates with the camera 190 through the CSI interface, to implement a photographing function of the electronic device. The processor 110 communicates with the display apparatus 180 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 190, the display apparatus 180, the communications module 130, the sensor module 140, the microphone 170C, and the like. The GPIO interface may alternatively be configured as an I2C interface, an I2S interface, a UART interface, an MIPI interface, or the like.

The USB port is an interface that conforms to a USB standard specification, and may be specifically a mini USB port, a micro USB port, a USB type-C port, or the like. The USB port may be configured to connect to a charger to charge the electronic device, or may be configured to transmit data between the electronic device and a peripheral device, or may be configured to connect to a headset for playing audio through the headset. The port may be further configured to be connected to another electronic device, for example, a mobile phone. The USB port may be a USB 3.0, and is configured to be compatible with a high-speed display port (display port, DP) for signal transmission, and may transmit high-speed audio and video data.

It may be understood that, an interface connection relationship between the modules shown in this embodiment of this application is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The electronic device may implement a wireless communication function by using the communications module 130. The communications module 130 may include an antenna, a wireless communications module, a mobile communications module, a modem processor, a baseband processor, and the like.

The antenna is configured to transmit and receive electromagnetic wave signals. The electronic device may include a plurality of antennas, and each antenna may be configured to cover one or more communication bands. Different antennas may be further multiplexed, to improve antenna utilization. For example, an antenna may be multiplexed as a diversity antenna in a wireless local area network. In some other embodiments, the antenna may be used in combination with a tuning switch.

The mobile communications module may provide a solution applied to the electronic device for wireless communication such as 2G/3G/4G/5G. The mobile communication module may include at least one filter, a switch, a power amplifier, a low noise amplifier (low noise amplifier, LNA), and the like. The mobile communication module may receive an electromagnetic wave through an antenna, perform processing such as filtering and amplifying on the received electromagnetic wave, and transmit the received electromagnetic wave to a modem processor for demodulation. The mobile communication module may further amplify a signal modulated by the modem processor, and convert the signal into an electromagnetic wave through an antenna and radiate the electromagnetic wave. In some embodiments, at least some functional modules of the mobile communication module may be disposed in the processor 110. In some embodiments, at least some functional modules of the mobile communication module and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The baseband processor processes the low-frequency baseband signal, and then transfers a processed signal to the application processor. The application processor outputs a sound signal by using an audio device (which is not limited to a speaker), or displays an image or a video by using the display apparatus 180. In some embodiments, the modem processor may be an independent device. In some other embodiments, the modem processor may be independent of the processor 110, and may be disposed in a same device with the mobile communication module or other functional modules.

The wireless communications module may provide a solution applied to the electronic device for wireless communication including a wireless local area network (wireless local area network, WLAN) (for example, wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module may be one or more devices integrating at least one communication processing module. The wireless communication module receives an electromagnetic wave through an antenna, performs frequency modulation and filtering processing on the electromagnetic wave signal, and sends a processed signal to the processor 110. The wireless communication module may further receive a to-be-sent signal from the processor 110, perform frequency modulation and amplification on the to-be-sent signal, and convert the signal into an electromagnetic wave through an antenna and radiate the signal.

In some embodiments, in the electronic device, the antenna is coupled to the mobile communications module, so that the electronic device may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global orbiting navigation satellite system (global navigation satellite system, GLONASS), a BeiDou navigation satellite system (BeiDou navigation satellite system, BDS), a quasi-zenith satellite system (quasi-zenith satellite system, QZSS) and/or a satellite based augmentation system (satellite based augmentation system, SBAS).

The electronic device implements the display function by using the GPU, the display apparatus 180, the application processor, and the like. The GPU is a microprocessor for image processing, and connects to the display apparatus 180 and the application processor. The GPU is configured to: perform mathematical and geometric calculation, and render an image. The processor 110 may include one or more GPUs that execute program instructions to generate or change display information.

In this embodiment of this application, the display apparatus 180 may be configured to present one or more virtual objects, so that the electronic device 100 provides a virtual reality scenario for a user. The display apparatus 180 may present the virtual object in one or more of the following manners:

1. In some embodiments, the display apparatus 180 is a display screen. The display screen may include a display panel. The display panel of the display apparatus 180 may be configured to display the virtual object, to present a three-dimensional virtual environment for the user. The user may see the virtual object on the display panel, and experience a virtual reality scenario. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

2. In some embodiments, the display apparatus 180 may include an optical apparatus for directly projecting an optical signal (for example, a light beam) onto a retina of the user. The user may directly see the virtual object from the optical signal projected by the optical apparatus, and sense a three-dimensional virtual environment. The optical apparatus may be a miniature projector, or the like.

The electronic device may include two display apparatuses 180, respectively corresponding to two eyeballs of the user. Content to be displayed on the two display apparatuses may be independently displayed. The two display apparatuses may display different images to improve a three-dimensional effect of the images. In some possible embodiments, the electronic device may include only one display apparatus 180, corresponding to two eyeballs of the user.

The electronic device may implement a photographing function by using the ISP, the camera 190, the video codec, the GPU, the display apparatus 180, the application processor, and the like.

The ISP is configured to process data fed back by the camera 190. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 190.

The camera 190 is configured to capture a static image or a video. An optical image of an object is generated through the lens, and is projected onto the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the electronic device may include one or N cameras 190, where N is a positive integer greater than 1. The camera 190 may include but is not limited to a conventional red green blue camera (RGB camera), a depth camera (RGB depth camera), a dynamic vision sensor (dynamic vision sensor, DVS) camera, and the like.

In some embodiments, the camera 190 may be a depth camera. The depth camera may collect spatial information of a real environment. For the spatial information of the real environment, refer to the foregoing related description.

In some embodiments, the camera 190 may collect a hand image or a body image of the user, and the processor 110 may be configured to analyze the image collected by the camera 190, so as to identify a hand action or a body action entered by the user.

In some embodiments, the camera 190 may be used in cooperation with an infrared device (such as an infrared emitter) to detect an eye action of the user, for example, an eyeball gaze direction, an eye blinking operation, or a gaze operation, to implement eyeball tracking (eyeball tracking).

The digital signal processor is configured to process a digital signal. In addition to processing the digital image signal, the digital signal processor may also process other digital signals. For example, when the electronic device selects a frequency, the digital signal processor is configured to perform Fourier transform on frequency energy.

The video codec is configured to: compress or decompress a digital video. The electronic device may support one or more video codecs. In this way, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. An application such as intelligent cognition, for example, image recognition, facial recognition, speech recognition, or text understanding of the electronic device may be implemented by using the NPU.

The memory 120 may be configured to store a computer-executable program code, where the executable program code includes instructions. The processor 110 runs the instructions stored in the memory 120, to execute various function applications of the electronic device and process data. The memory 120 may include a program storage area and a data storage area. The program storage area may store an operating system, applications (for example, VR/AR/MR applications) required by at least one function (for example, a sound playing function or an image playing function), and the like. The data storage area may store data (such as audio data and a phone book) created when the electronic device is used, and the like. In addition, the memory 120 may include a high-speed random access memory, and may also include a non-volatile memory, for example, at least one magnetic disk storage device, a flash memory device, or a universal flash storage (universal flash storage, UFS), and the like.

The electronic device may implement an audio function by using the audio module 170, the speaker 170A, the microphone 170C, the headset jack 170D, the application processor, and the like.

The audio module 170 is configured to convert digital audio information into an analog audio signal output, and is also configured to convert an analog audio input into a digital audio signal. The audio module may be further configured to code and decode an audio signal. In some embodiments, the audio module may be disposed in the processor 110, or some functional modules in the audio module are disposed in the processor 110.

The speaker 170A, also referred to as a "loudspeaker", is configured to convert an audio electrical signal into a sound signal. The electronic device may listen to music or answer a hands-free call through the speaker 170A.

The microphone 170C, also referred to as a "mike" or a "mic", is configured to convert a sound signal into an electrical signal. At least one microphone 140 may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphone may further identify a sound source, to implement a directional recording function, and the like.

In some embodiments, the microphone 170C may detect a voice signal used to control the portable electronic device. The processor 110 may then process the voice signal to recognize a voice command.

The headset jack is configured to connect to a wired headset. The headset jack may be a USB port, or may be a 3.5 mm open mobile terminal platform (open mobile terminal platform, OMTP) standard interface or cellular telecommunications industry association of the USA (cellular telecommunications industry association of the USA, CTIA) standard interface.

In some embodiments, the electronic device may include one or more buttons 150. These buttons may control the electronic device to provide access to functions on the electronic device for the user. The button 150 may be in a form of a command button, a switch, a dial, and a touch or near-touch sensing device (such as a touch sensor). Specifically, for example, the user may turn on the display apparatus 180 of the electronic device by pressing the button. The button 150 includes a power button, a volume button, and the like. The button 150 may be a mechanical button, or may be a touch button. The electronic device may receive a button input, and generate a button signal input related to user settings and function control of the electronic device.

In some embodiments, the electronic device may include the input/output interface 160, and the input/output interface 160 may connect another apparatus to the electronic device by using an appropriate component. The component may include, for example, an audio jack/a video jack, or a data connector.

The sensor module 140 may include a plurality of sensors, for example, an optical proximity sensor, a distance sensor, a gyroscope sensor, an ambient optical sensor, an acceleration sensor, a temperature sensor, a magnetic sensor, a bone conduction sensor, and a fingerprint sensor.

For example, the optical proximity sensor may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect a gesture operation at a specific location of the electronic device 100 by using the proximity light sensor, to associate the gesture operation with an operation command.

The distance sensor may be configured to measure a distance. The electronic device may measure the distance in an infrared or a laser manner.

The gyroscope sensor may be configured to determine a motion posture of the electronic device. In some embodiments, the gyroscope sensor may be used to determine angular velocities of the electronic device around three axes (namely, axes x, y, and z). The gyroscope sensor may also be used in navigation and somatic game scenarios.

The ambient light sensor is configured to sense ambient light luminance. The electronic device may adaptively adjust brightness of the display apparatus 180 based on the sensed ambient light luminance. The ambient light sensor may also be configured to automatically adjust white balance during photographing.

The acceleration sensor may detect magnitudes of accelerations in various directions (usually on three axes) of the electronic device, and may detect a magnitude and a direction of gravity when the electronic device is still. The acceleration sensor may be further configured to identify a posture of the electronic device, and is applied to an application such as a pedometer.

In some embodiments of this application, the electronic device 100 may track movement of the head of the user based on the acceleration sensor, the gyroscope sensor, the magnetic sensor, and the like.

The temperature sensor is configured to detect a temperature. In some embodiments, the electronic device executes a temperature processing policy by using the temperature detected by the temperature sensor. For example, when the temperature reported by the temperature sensor exceeds a threshold, the electronic device degrades performance of a processor near the temperature sensor, to reduce power consumption and implement thermal protection. In some other embodiments, when the temperature is lower than another threshold, the electronic device heats up the battery 1100, to avoid abnormal shutdown of the electronic device due to a low temperature. In some other embodiments, when the temperature is lower than still another threshold, the electronic device boosts an output voltage of the battery 1100 to avoid abnormal shutdown due to a low temperature.

In this embodiment of this application, the memory 120 may be configured to store spatial information of virtual objects corresponding to one or more application programs. The processor 110 may be configured to determine, based on spatial information of a real object and the spatial information of the virtual object, whether the virtual object and the real object overlap, that is, determine whether there is an overlapping area. For a detailed operation of determining, by the processor 110, whether there is an overlapping area, refer to related description in a subsequent embodiment.

In this embodiment of this application, one or more of the display apparatus 190, the speaker 170A, the flash, or the motor may be configured to output prompt information used to indicate that there is currently an overlapping area. Herein, for a specific operation of outputting the prompt information by the display apparatus 190, the speaker 170A, the flash, or the motor, refer to related description in a subsequent embodiment.

In this embodiment of this application, one or more of the display apparatus 190, the speaker 170A, the flash, or the motor may be configured to output prompt information used to direct the user to perform effective interaction. Herein, for a specific operation of outputting the prompt information by the display apparatus 190, the flash, or the motor, refer to related description in a subsequent embodiment.

A software system of the electronic device 100 may use a layered architecture, an event-driven architecture, a microkernel architecture, a micro service architecture, a cloud architecture, or the like. This is not limited in this application. For example, the electronic device 100 in this embodiment of this application may be equipped with iOS, Android, Microsoft, or another operating system.

Based on the electronic device 100 shown in FIG. 1, the embodiments of this application provide an interaction method in a virtual reality scenario. The interaction method in the virtual reality scenario provided in this application is described below with reference to a specific application scenario and a user interface provided in the embodiments of this application.

The term "user interface (user interface, UI)" in the embodiments of this application is a medium interface for interaction and information exchange between an application program or an operating system and a user. The user interface implements conversion between an internal form of information and a form acceptable to the user. A common representation form of the user interface is a graphical user interface (graphical user interface, GUI), and is a user interface that is displayed in a graphical manner and that is related to a computer operation. The user interface may be an interface element such as an icon, a window, or a control displayed on a display screen of the electronic device or presented in another manner. The control may include a visual interface element such as an icon, a button, a menu, a tab, a text box, a dialog box, a status bar, a navigation bar, or a widget.

Figure 2B:
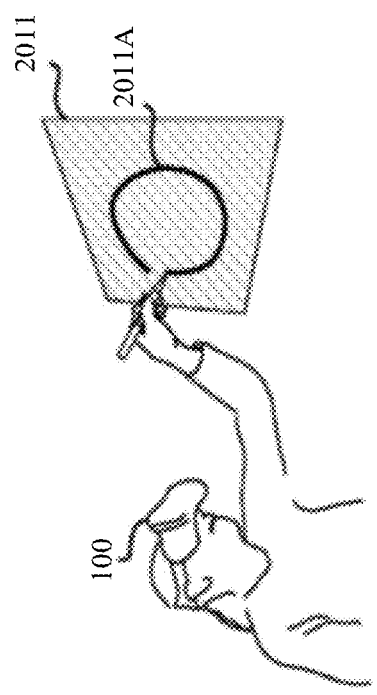
Figure 2A:
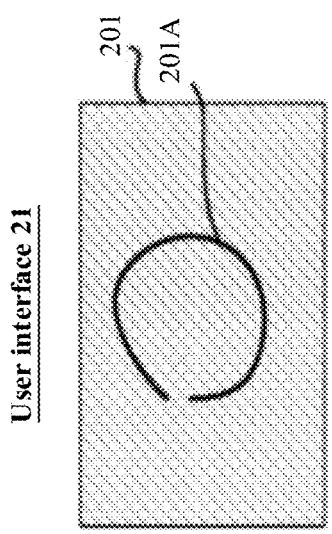

FIG. 2A shows an example of a user interface 21 displayed on the display screen of the electronic device 100. The user interface 21 includes a virtual object 201. The user interface 21 may be provided by the electronic device 100 when running a painting application, and the virtual object 201 may be a virtual canvas. This is not limited to the one display screen shown in FIG. 2A. In some other embodiments, the electronic device 100 may provide two or more display screens to display the user interface 21 shown in FIG. 2A.

FIG. 2B shows an example of a virtual reality scenario provided for the user when the electronic device displays the user interface 21 on the display screen. As shown in FIG. 2B, a virtual mapping object obtained after the virtual object 201 is mapped to a real environment is 2011. When wearing the electronic device 100 (for example, a head-mounted display) on the head, the user may see a picture shown in FIG. 2A, and may sense a three-dimensional virtual environment that is provided by the electronic device 100 and that is shown in FIG. 2B.

It may be understood that FIG. 2B is a schematic diagram in which the electronic device 100 provides a virtual reality scenario, and another user cannot see or sense the virtual mapping object 2011 obtained after the virtual object 201 is mapped to the real environment.

The virtual object 201 is not limited to being directly displayed on the display screen shown in FIG. 2A. In some other embodiments, an optical apparatus may be configured for the electronic device 100, and an optical signal is projected onto a retina of the user by using the optical apparatus, so that the user sees the virtual object 201, and senses the virtual reality scenario shown in FIG. 2B.

The virtual object 201 may interact with the user. Referring to FIG. 2B, the user may draw a graph on the virtual mapping object 2011 of the virtual object 201 by using a virtual stylus or a finger. As shown in FIG. 2A and FIG. 2B, the electronic device 100 displays a graph 201A on the virtual object 201 on the user interface 21 in response to an operation of drawing a graph 2011A. It may be understood that the graph 201A is a virtual object, and a virtual mapping object of the graph 201A is the graph 2011A drawn by the user. That is, the user may interact with the virtual mapping object of the virtual object, to interact with the virtual object.

When the electronic device 100 provides the virtual reality scenario, a real object and the virtual mapping object of the virtual object may overlap in the real environment, that is, there may be an overlapping area.

In some embodiments, the overlapping area may be generated due to movement of the user or the electronic device 100. For example, in a process in which the user wears the electronic device 100 to experience the virtual reality scenario, when the user walks in a room or outdoors, the real object and the virtual mapping object of the virtual object overlap in the real environment. In some other embodiments, the overlapping area may be generated because the electronic device 100 switches the user interface or changes a depth of the virtual object. It may be understood that the virtual object displayed after the electronic device switches the user interface changes. Therefore, the depth of the virtual object may also change.

Figure 2C:
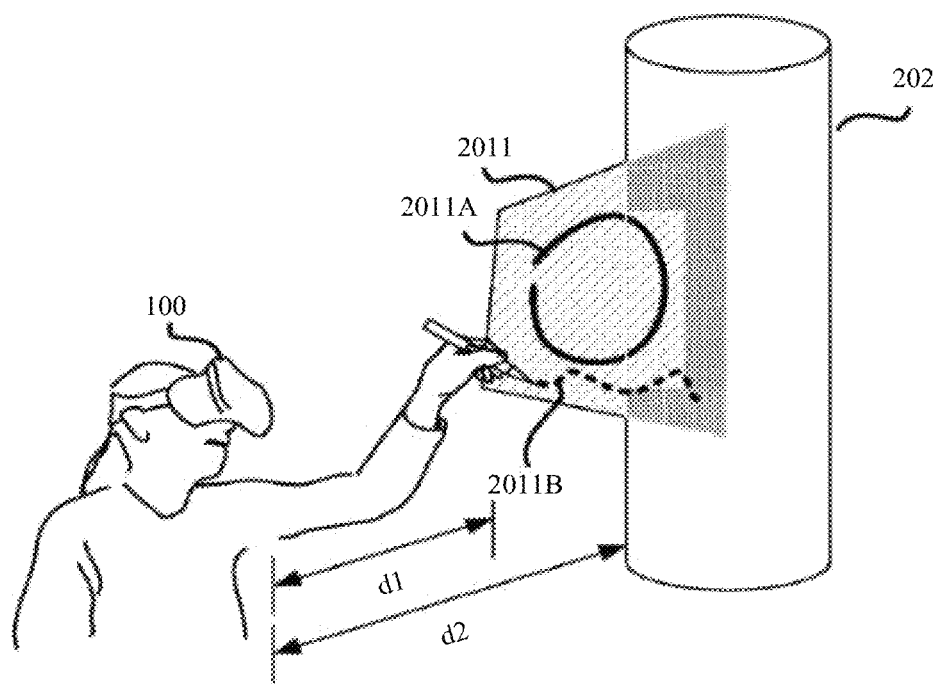

FIG. 2C is a schematic diagram in which there is an overlapping area when the electronic device 100 provides the virtual reality scenario. As shown in FIG. 2C, the real environment includes a real object 202, and a right half part of the virtual mapping object 2011 and a middle part of the real object 202 overlap.

In this embodiment of this application, the electronic device 100 may determine, by performing the following steps, whether the virtual mapping object of the virtual object and the real object overlap in the real environment. That is, the electronic device 100 may determine, by performing the following steps, whether there is currently an overlapping area:

Step 1: The electronic device 100 obtains spatial information of the real object.

Specifically, one or more of a depth camera, an infrared transceiver apparatus, and an ultrasonic transceiver apparatus may be configured for the electronic device 100, and the spatial information of the real object is collected by using the configured apparatus. Herein, for detailed explanation of the spatial information of the real object, refer to the foregoing related description.

The virtual reality scenario shown in FIG. 2C is used as an example. In this case, the spatial information of the real object that is obtained by the electronic device 100 may include: There is the real object 202 straight ahead of the user, and a depth of the real object 202 is d2. It may be understood that the virtual reality scenario shown in FIG. 2C is merely an example. In specific implementation, the real environment in which the electronic device 100 or the user is located may include more real objects, and the real object may be 3D. The 3D real object may have a plurality of depths.

Step 2: The electronic device 100 obtains spatial information of the virtual object.

Specifically, the electronic device provides the virtual environment for the user based on the spatial information of the virtual object. Therefore, when providing the virtual environment for the user, the electronic device 100 may learn of currently provided spatial information of the virtual object. The electronic device 100 may obtain the currently provided spatial information of the virtual object in the following two manners:

1. When the electronic device 100 provides the virtual environment by running an application program, if the user does not actively change the spatial information of the virtual object, the electronic device 100 may obtain the currently provided spatial information of the virtual object from stored related information of a virtual environment corresponding to the application program.

Herein, the spatial information of the virtual object that is stored by the electronic device 100 may be referred to as preset spatial information of the virtual object. The preset spatial information of the virtual object may be set by a developer who develops the application program based on a comfort level of the user when the user is in the virtual environment. The preset spatial information of the virtual object may be obtained synchronously when the electronic device 100 downloads the application program, or may be obtained when the application program is subsequently updated.

Usually, when providing the virtual environment for the user based on the preset spatial information of the virtual object, the electronic device 100 does not frequently change the preset spatial information of the virtual object, to prevent the user from feeling visually fatigue. For example, referring to FIG. 2C, the electronic device 100 does not change a location of the virtual object 201 relative to the user or the depth of the virtual object 201.

If the user does not actively change the preset spatial information of the virtual object, the preset spatial information of the virtual object is the spatial information of the virtual object that is currently provided by the electronic device 100.

2. When the electronic device 100 provides the virtual environment by running an application program, if the user actively changes the spatial information of the virtual object, the currently provided spatial information of the virtual object is determined with reference to preset spatial information of the virtual object and a user operation. Herein, the user operation is an input operation used to change the spatial information of the virtual object.

In some embodiments of this application, after providing the virtual environment for the user based on the preset spatial information of the virtual object, the electronic device 100 may further change the current spatial information of the virtual object in response to a user operation. The user operation used to change the spatial information of the virtual object may include but is not limited to a voice instruction, a gesture instruction (for example, a two-finger zoom gesture in a virtual control), an eyeball movement instruction, or another type of instructions. For example, referring to FIG. 2C, after providing the virtual environment for the user based on the preset spatial information of the virtual object, the electronic device 100 may increase or decrease the depth of the virtual object 201 in response to the user operation.

If the electronic device changes the preset spatial information of the virtual object based on the user operation, the electronic device 100 may obtain changed spatial information of the virtual object with reference to the user operation and the preset spatial information of the virtual object, that is, obtain the currently provided spatial information of the virtual object.

The electronic device 100 may obtain the currently provided spatial information of the virtual object in either of the two manners.

The virtual reality scenario shown in FIG. 2C is used as an example. In this case, the spatial information of the virtual object that is currently provided by the electronic device 100 may include: There is the virtual object 201 straight ahead of the user, and the depth of the virtual object 201 is d1. It may be understood that the virtual reality scenario shown in FIG. 2C is merely an example. In specific implementation, the virtual environment provided by the electronic device 100 may include more virtual objects, and the virtual object may be 3D. The 3D virtual object may have a plurality of depths.

It may be understood that a sequence of performing step 1 and step 2 is not limited in this embodiment of this application.

Step 3: The electronic device 100 determines, based on the spatial information of the real object and the spatial information of the virtual object, whether the virtual mapping object of the virtual object and the real object overlap in the real environment, that is, determines whether there is an overlapping area.

After obtaining the spatial information of the real object and the spatial information of the virtual object, the electronic device 100 may learn of a location of the real object relative to the electronic device 100 and a location of the virtual object relative to the electronic device 100, and determine whether the virtual mapping object of the virtual object and the real object overlap in the real environment.

Specifically, the electronic device 100 may establish a three-dimensional coordinate system, and determine, in the three-dimensional coordinate system, whether the virtual mapping object of the virtual object and the real object overlap in the real environment. Further, the electronic device 100 may establish a space model in the three-dimensional coordinate system based on the spatial information of the real object and the spatial information of the virtual object. This is equivalent to placing the real object and the virtual mapping object of the virtual object in a same three-dimensional coordinate system. The electronic device 100 may compare a distance between the real object and the virtual mapping object of the virtual object in the three-dimensional coordinate system. If the distance between the real object and the virtual mapping object of the virtual object is less than or equal to 0, the real object and the virtual mapping object of the virtual object overlap in the real environment. That is, there is an overlapping area. The overlapping area may be all or a part of an area in which the virtual mapping object of the virtual object is located.

Herein, the three-dimensional coordinate system may be a geodetic coordinate system, a three-dimensional coordinate system whose point of origin is a location of the user/the electronic device 100, or another three-dimensional coordinate system. This is not limited in this application.

In this embodiment of this application, the electronic device may perform, based on any one of the following policies, the process (namely, step 1 to step 3) of determining whether there is an overlapping area:

1. The electronic device 100 performs steps 1 to step 3 in real time during running.

Specifically, the electronic device 100 may continuously perform step 1 to step 3 in real time after being powered on and running. In this way, the electronic device 100 may accurately identify all overlapping areas.

2. The electronic device 100 periodically performs step 1 to step 3.

Specifically, the electronic device 100 may perform step 1 to step 3 based on a preset period, for example, every 5 minutes. In this way, the overlapping area may be identified without consuming excessive resources of the electronic device 100.

3. The electronic device 100 determines, based on a type of a currently running application program, whether step 1 to step 3 need to be performed.

Specifically, the electronic device 100 may run a different application program, to provide a virtual reality scenario corresponding to the application program.

In virtual reality scenarios corresponding to some application programs such as a video play application program, the user does not need to interact with the virtual object, and the user does not need to move. When running this type of application programs, the electronic device 100 does not need to perform step 1 to step 3.

In virtual reality scenarios corresponding to some application programs such as a motion sensing game application program, the user needs to frequently interact with the virtual object, and the user is very likely to move. When running this type of application programs, the electronic device 100 may perform step 1 to step 3. In this embodiment of this application, this type of application programs may be referred to as a first application program.

4. The electronic device 100 determines, based on a current location, whether step 1 to step 3 need to be performed.

In some embodiments, the user is much safer indoors than outdoors, and the user is more likely to touch the real object in the real outdoor environment. Therefore, the electronic device 100 may perform step 1 to step 3 when the user is outdoors, and does not need to perform step 1 to step 3 when the user is indoors. Herein, the electronic device 100 may obtain current location information of the user in a manner such as GPS, Wi-Fi positioning, or base station positioning, and determine whether the user is outdoors.

5. Before providing the virtual environment or when providing the virtual environment, the electronic device 100 performs step 1 to step 3.

Specifically, before providing the virtual reality scenario shown in FIG. 2B, for example, after receiving an operation used to create the virtual object 201, the electronic device 100 may perform step 1 to step 3. The electronic device may alternatively perform step 1 to step 3 when providing the virtual reality scenario shown in FIG. 2B, that is, when starting to display the virtual object 201.

This is not limited to the five policies. In specific implementation, the electronic device 100 may alternatively perform step 1 to step 3 based on another policy. This is not limited in this embodiment of this application. For example, the electronic device 100 may alternatively perform step 1 to step 3 after being triggered by the user. For another example, the electronic device 100 may alternatively perform step 1 to step 3 when moving.

In this embodiment of this application, when the electronic device 100 determines that the virtual mapping object of the virtual object and the real object overlap, that is, determines that there is an overlapping area, the electronic device 100 continuously displays the virtual object, and the electronic device may output prompt information, and perform interaction failure processing on the overlapping area. The prompt information is used to prompt the user that there is currently an overlapping area. Further, the prompt information may be further used to prompt the user with a specific location of the overlapping area. In this embodiment of this application, the prompt information may be referred to as first prompt information.

FIG. 2C shows a manner in which the electronic device 100 outputs the prompt information used to prompt the user that there is currently an overlapping area and indicate the specific location of the overlapping area. As shown in FIG. 2C, the electronic device 100 may cover the overlapping area by using a gray shadow, to prompt the user that an area covered by the gray shadow is the overlapping area. It should be noted that the electronic device 100 may directly display the gray shadow on the virtual object corresponding to the overlapping area on the display screen, or may project an optical signal onto the retina of the user by using the optical apparatus, so that the user sees the gray shadow in the overlapping area.

The prompt information is not limited to being output in the manner in which the overlapping area is covered by using a gray shadow and that is shown in FIG. 2C. The electronic device 100 may output the prompt information in another display effect. For example, the electronic device may alternatively stop displaying a part or all of content corresponding to the overlapping area on the display screen, for example, stop displaying a right half part of the virtual object 201A. For another example, the electronic device may alternatively present the overlapping area in a display effect different from that of a non-overlapping area. For example, the electronic device displays a right half of the virtual object 201A by using a dashed line, displays a right half part of the virtual object 201A in a relatively light color, highlights a right half part of the virtual object 201A, or displays a right half part of the virtual object 201A in a transparent manner. For another example, the electronic device 100 may alternatively display text information (for example, text "dangerous" or "obstructed") in the overlapping area.

This is not limited to outputting visual prompt information. The electronic device 100 may output audio, a flash feedback, a vibration feedback, or another type of prompt information, to prompt the user with the location of the overlapping area.

After the electronic device 100 outputs the prompt information, the user may learn that there is currently an overlapping area, and may further learn of the specific location of the overlapping area. Therefore, the user is prevented from interacting with the virtual object in the overlapping area, and can be prevented from colliding with the real object in the overlapping area. In this way, user safety can be ensured, and user experience of the electronic device 100 is improved.

In this embodiment of this application, when the electronic device determines that there is an overlapping area, the electronic device 100 continuously displays the virtual object, and may further perform interaction failure processing on the overlapping area in addition to outputting the prompt information. After the electronic device performs interaction failure processing on the overlapping area, the electronic device no longer makes a corresponding feedback in response to an operation performed on the virtual mapping object of the virtual object in the overlapping area. Herein, that the electronic device no longer makes a corresponding feedback in response to an operation performed on the virtual mapping object of the virtual object in the overlapping area may include the following two cases: 1. The electronic device does not detect any operation that acts on the overlapping area, and therefore does not make a corresponding feedback in response to the operation performed on the virtual mapping object of the virtual object in the overlapping area. 2. The electronic device still detects an operation that acts on the overlapping area, but does not make a corresponding feedback in response to the operation.

Herein, the operation performed on the virtual mapping object of the virtual object in the overlapping area may include but is not limited to a gesture (for example, a gesture such as tap, touch, press and hold, or slide) that acts on the virtual mapping object, an eye blink operation that acts on the virtual mapping object, a gaze operation (for example, a gaze operation that lasts longer than preset duration) that acts on the virtual mapping object, or a voice instruction. It may be understood that this is not limited to an operation that is directly input by using a body part of the user. The operation performed on the virtual mapping object of the virtual object in the overlapping area may alternatively be an operation input by the user by using a handheld device. This is not limited in this embodiment of this application.

Figure 2E:
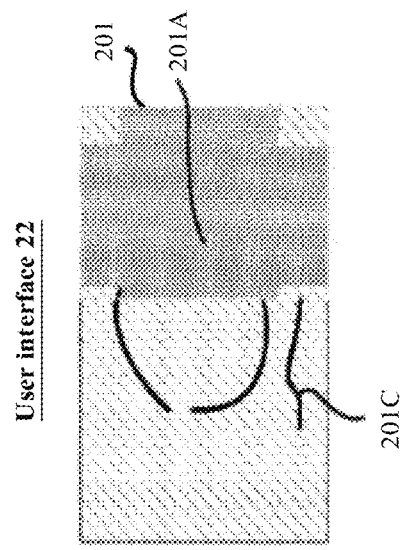
Figure 2D:
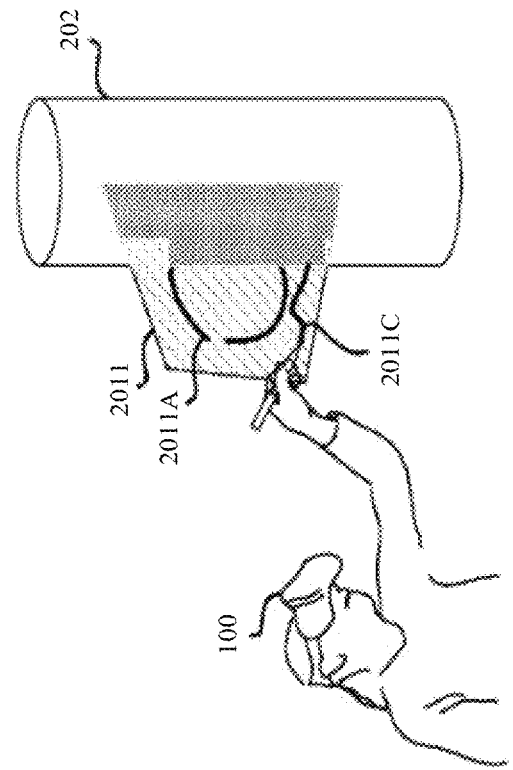

FIG. 2C and FIG. 2D show a scenario in which the user interacts with the virtual object in the virtual environment after the electronic device 100 performs interaction failure processing on the overlapping area. Referring to FIG. 2C, the user inputs a trajectory 2011B on the virtual mapping object 2011 of the virtual object 201 by using the stylus, and a part of the trajectory 2011B acts on the overlapping area. Referring to FIG. 2D, the electronic device 100 displays a corresponding graph on the virtual canvas only in response to an operation of inputting the trajectory 2011B in the non-overlapping area, and does not display a corresponding graph on the virtual canvas in response to an operation of inputting the trajectory 2011B in the overlapping area.

Referring to FIG. 2E, if the display screen is configured for the electronic device 100, after the user inputs the trajectory 2011B, a graph displayed by the electronic device 100 on the virtual canvas 201 is a line 201C. A virtual mapping object obtained after the graph 201C is mapped to the real environment is 2011C shown in FIG. 2D.

After the electronic device performs interaction failure processing on the overlapping area, in a process of interacting with the virtual mapping object of the virtual object in the overlapping area, the electronic device 100 does not make a corresponding feedback, and therefore the user may learn that the area is an overlapping area.

It may be learned from the foregoing embodiments in FIG. 2C to FIG. 2E that after the electronic device 100 determines that there is an overlapping area, that is, after the electronic device 100 determines that the virtual mapping object of the virtual object and the real object overlap in the real environment, the electronic device 100 still continuously provides the virtual reality scenario. In this way, it can be ensured that interaction between the user and the electronic device 100 is not interrupted, and therefore continuous immersive experience is provided for the user, to achieve a better virtual reality effect. That interaction between the user and the electronic device 100 is not interrupted means that the user can still input a user operation in the virtual environment provided by the electronic device 100. Whether the electronic device 100 makes a corresponding feedback in response to the user operation depends on whether an area on which the user operation acts is an overlapping area.

In some embodiments of this application, after performing interaction failure processing on the overlapping area, the electronic device 100 may further output prompt information used to direct the user to perform effective interaction.

In this embodiment of this application, the user may perform effective interaction with the electronic device 100 in the non-overlapping area. The electronic device 100 may direct the user to eliminate the overlapping area, so that the virtual mapping object of the virtual object and the real object no longer overlap. After the overlapping area is eliminated, all virtual objects in the virtual environment may perform effective interaction with the user. That is, the electronic device 100 may make a corresponding feedback in response to an operation performed on any virtual object in the virtual environment.

In this embodiment of this application, the electronic device 100 may provide the virtual environment in different manners. A manner of directing, by the electronic device 100, the user to perform effective interaction, that is, outputting, by the electronic device 100, the prompt information used to direct the user to perform effective interaction, varies with a manner of providing the virtual environment. The following provides description with reference to two manners of providing the virtual environment.

1. When the electronic device 100 provides the virtual environment, a location of a virtual mapping object of each virtual object in the virtual environment relative to the user is kept unchanged.

In the manner 1, before or after the user turns to a direction or moves, the location of the virtual mapping object of each virtual object in the virtual environment relative to the user remains unchanged. For example, before turning to a direction, the user senses that there is the virtual object 1 meter straight ahead in the virtual environment, and after turning to a direction, the user may still sense that there is the virtual object 1 meter straight ahead. It may be understood that the electronic device 100 usually provides a scenario such as a virtual 3D movie or a virtual canvas for the user in the manner 1. When the electronic device 100 provides the virtual environment in the manner 1, the location of the virtual mapping object of each virtual object in the virtual environment relative to the user remains unchanged, and an absolute location of the real environment remains unchanged, and therefore the user may change a location of the virtual mapping object of each virtual object relative to the real object by turning to a direction or moving, to eliminate the overlapping area.

Specifically, after the electronic device 100 determines, by using the obtained spatial information of the real object and the obtained spatial information of the virtual object, a direction to which the user turns or a location to which the user moves, the overlapping area may be eliminated. Further, the electronic device 100 may establish a space model in the three-dimensional coordinate system based on the spatial information of the real object and the spatial information of the virtual object, and determine a direction that the user faces and in which the real object and the virtual mapping object of the virtual object do not overlap or a location at which the user is located and at which the real object and the virtual mapping object of the virtual object do not overlap. In this way, the electronic device 100 may determine that the overlapping area may be eliminated after the user turns to the direction or moves to the location.

When providing the virtual environment in the manner 1, the electronic device 100 outputs prompt information used to direct the user to perform effective interaction. That is, the electronic device 100 prompts the user to turn to a specific direction or move to a specific location. When the virtual environment is provided in the manner 1, the prompt information that is output by the electronic device 100 and that is used to direct the user to perform effective interaction may be referred to as second prompt information, the direction to which the user is prompted by the electronic device to turn may be referred to as a first direction, and the location to which the user is prompted by the electronic device to move may be referred to as a first location.

Figure 2G:
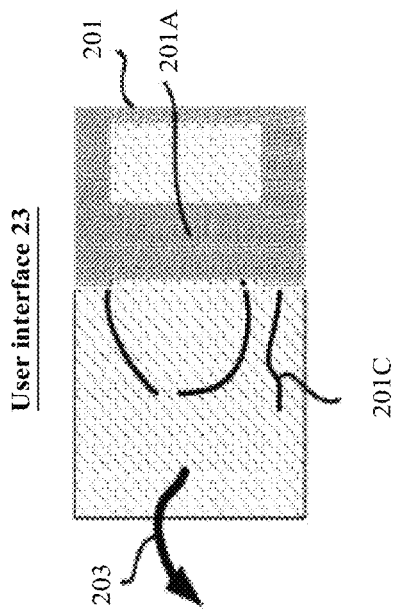
Figure 2F:
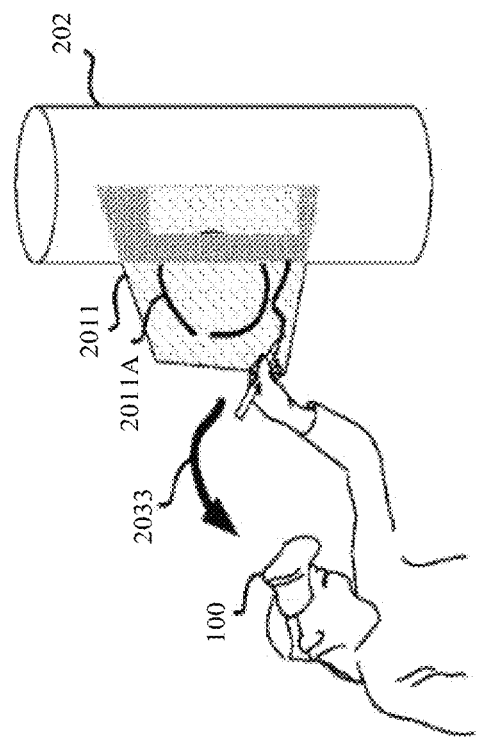

FIG. 2F and FIG. 2G show a manner in which the electronic device 100 outputs the prompt information used to direct the user to perform effective interaction. The electronic device 100 may display, in the virtual environment, an arrow 203 used to indicate the user to turn to a direction. The arrow 203 is a virtual object. After the user turns to a direction indicated by the arrow 203, there is no overlapping area. It should be noted that the electronic device 100 may directly display the arrow 203 on the display screen, or may project an optical signal to the retina of the user by using the optical apparatus, so that the user sees the arrow 203.

Referring to FIG. 2G, if the display screen is configured for the electronic device 100, when the electronic device 100 provides a virtual reality scenario shown in FIG. 2F, a user interface 23 shown in FIG. 2G may be displayed on the display screen. Herein, for a picture actually seen by the user, refer to FIG. 2G.

The user is not limited to being prompted, by using the arrow 203, to turn to a direction. The electronic device 100 may prompt, in another display effect, the user to turn to a direction. For example, the electronic device 100 may alternatively output text information (for example, text information "please turn left 45 degrees for effective interaction") to prompt the user to turn to a direction.

This is not limited to outputting visual prompt information. The electronic device 100 may output prompt information such as audio, a flash feedback, or a vibration feedback, to prompt the user to turn to a direction, so that the user performs effective interaction with the electronic device 100.

FIG. 2H is a schematic diagram of a scenario after the user turns to a direction based on a prompt of the electronic device 100. As shown in FIG. 2H, after the user turns to a direction based on a prompt of the arrow 203, the location of the virtual mapping object of the virtual object relative to the user remains unchanged, the absolute location of the real object remains unchanged, and the real object and the virtual mapping object of the virtual object no longer overlap, that is, there is no longer an overlapping area. After the overlapping area is eliminated, all the virtual objects in the virtual environment may perform effective interaction with the user. That is, the electronic device 100 may make a corresponding feedback in response to an operation performed on any virtual object in the virtual environment.

Referring to FIG. 2I, if the display screen is configured for the electronic device 100, when the electronic device 100 provides the virtual reality scenario shown in FIG. 2H, a user interface 24 shown in FIG. 2I may be displayed on the display screen. Herein, for a picture actually seen by the user, refer to FIG. 2I.

2. When the electronic device 100 provides the virtual environment, an absolute location of a virtual mapping object of each virtual object in the virtual environment in the real environment is kept unchanged. That is, a location of the virtual mapping object of the virtual object in the real environment relative to each physical object in the current real environment remains unchanged.

Figure 3A:
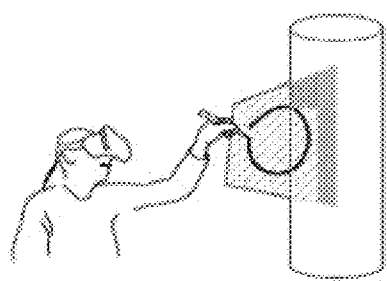
Figure 3B:
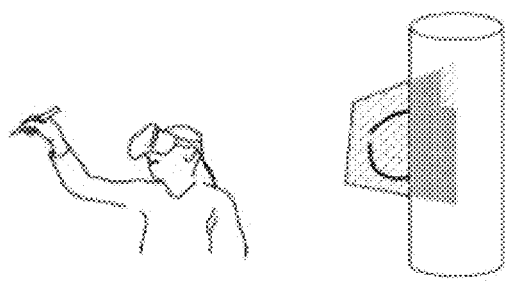

In the manner 2, before and after the user turns to a direction or moves, a location of the virtual mapping object of each virtual object in the virtual environment and the user changes, and the location of the virtual mapping object of each virtual object relative to each physical object remains unchanged. For example, before turning to a direction, the user senses that there is the virtual object 1 meter straight ahead in the virtual environment, and after turning 180 degrees, the user may sense that there is the virtual object 1 meter straight behind. FIG. 3A shows an example of a scenario in which the electronic device 100 provides the virtual environment in the manner 2, and FIG. 3B shows an example of a scenario after the user turns 180 degrees. It may be understood that the electronic device 100 usually provides a game and space exploration scenario for the user in the manner 2.

When the electronic device 100 provides the virtual environment in the manner 2, the location of the virtual mapping object of the virtual object in the virtual environment relative to each physical object in the current real environment remains unchanged, and therefore the overlapping area cannot be directly eliminated by turning to a direction or moving, and the user may eliminate the overlapping area by triggering, after turning to a direction or moving, the electronic device to provide the virtual environment again. A manner in which the user triggers the electronic device to provide the virtual environment again may include restarting the electronic device, restarting an application running in the electronic device, or the like.

Specifically, after the electronic device 100 determines, by using the obtained spatial information of the real object and the obtained spatial information of the virtual object, a direction to which the user turns/or a location to which the user moves, and provides the virtual environment again, the overlapping area may be eliminated.

When the virtual environment is provided in the manner 2, prompt information that is output by the electronic device 100 and that is used to direct the user to perform effective interaction may be referred to as third prompt information, a direction to which the user is prompted by the electronic device to turn may be referred to as a second direction, and a location to which the user is prompted by the electronic device to move may be referred to as a second location.

Figure 3C:
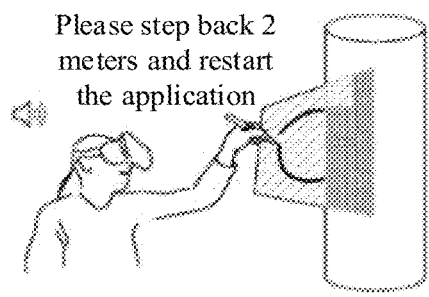

FIG. 3C shows a manner in which the electronic device 100 outputs the prompt information used to direct the user to perform effective interaction. As shown in FIG. 3C, the electronic device 100 may play a voice (for example, "please step back 2 meters and restart the application") used to indicate the user to perform effective interaction. After the user steps back 2 meters and restarts the application based on the voice, there is no overlapping area.

The prompt information is not limited to being output by using the voice shown in FIG. 3C. The electronic device 100 may output prompt information such as text, a flash feedback, or a vibration feedback, to prompt the user to eliminate the overlapping area, so that the user performs effective interaction with the electronic device 100.

Figure 3D:
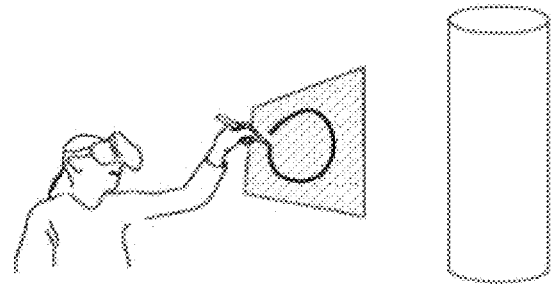

FIG. 3D is a schematic diagram of a scenario after the user steps back 2 meters and restarts the application based on a prompt of the electronic device 100. As shown in FIG. 3D, after the user steps back 2 meters and restarts the application based on the voice, the real object and the virtual mapping object of the virtual object no longer overlap, that is, there is no longer an overlapping area.

It may be understood that in the foregoing embodiment, the prompt information that is output by the electronic device 100 and that is used to direct the user to perform effective interaction may also be used to indicate the user to turn to a safe direction or move to a safe location, to prevent the user from colliding with the real object, so as to ensure user safety.

In the embodiments in FIG. 2F to FIG. 2I, FIG. 3C, and FIG. 3D, the user may perform a corresponding operation based on the prompt of the electronic device, to eliminate the overlapping area. After eliminating the overlapping area, the user may perform effective interaction with the virtual object.

It may be learned from the embodiments in FIG. 2A to FIG. 2I and FIG. 3A to FIG. 3D that in implementation of the technical solutions provided in the embodiments of this application, when providing the virtual environment by using a VR technology, the electronic device may collect the spatial information of the real object, and determine, based on the spatial information of the real object and the spatial information of the virtual object, whether the virtual mapping object of the virtual object and the real object overlap in the real environment, and if the virtual mapping object of the virtual object and the real object overlap in the real environment, the electronic device may prompt the user that there is currently an overlapping area, and perform interaction failure processing on the overlapping area.

In implementation of the method provided in the embodiments of this application, based on the prompt of the electronic device, the user can be prevented from colliding with the real object in the real environment, to ensure user safety. In addition, according to the method provided in the embodiments of this application, an interaction operation between the user and the virtual environment is not interrupted, and therefore immersive experience is provided for the user, thereby improving user experience of the electronic device.

The implementations of this application may be randomly combined to achieve different technical effects.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art may understand that all or some of the procedures of the methods in the embodiments may be implemented by a computer program instructing related hardware. The program may be stored in a computer-readable storage medium. When the program is executed, the procedures of the methods in the embodiments are performed. The storage medium includes any medium that can store program code, for example, a ROM, a random access memory RAM, a magnetic disk, or an optical disc.

In summary, the foregoing descriptions are only embodiments of the technical solutions of the present invention, but are not intended to limit the protection scope of the present invention. Any modification, equivalent replacement, and improvement made according to the disclosure of the present invention shall fall within the protection scope of the present invention.

What is claimed is:

1. An interaction method implemented by an electronic device, wherein the interaction method comprises:
   displaying to a user a virtual object on a display screen configured to provide a virtual reality scenario;
   mapping the virtual object to a real environment to obtain a virtual mapping object, wherein, based on the virtual reality scenario, the real environment is not displayed on the display screen and the user cannot see the real environment;
   determining whether the virtual mapping object and a real object overlap, wherein the real environment comprises the real object, and wherein the real object is not displayed with the virtual mapping object on the display screen; and
   in response to the virtual mapping object and the real object overlapping:
      outputting first prompt information indicating that the virtual mapping object and the real object, which is not displayed on the display screen, overlap;
      continuing displaying the virtual object; and
      stopping detection of an operation that acts on an overlapping area of the virtual mapping object and the real object or skipping responding to the operation when detecting the operation.

2. The interaction method of claim 1, wherein the first prompt information further indicates the overlapping area.

3. The interaction method of claim 1, wherein the first prompt information comprises one or more of a visual element, a voice, an indicator feedback, or a vibration feedback.

4. The interaction method of claim 1, further comprising displaying the overlapping area in a preset effect.

5. The interaction method of claim 1, further comprising:
   establishing a three-dimensional coordinate system;
   determining, in the three-dimensional coordinate system, whether a distance between the virtual mapping object and the real object is less than or equal to 0;
   determining that the virtual mapping object and the real object overlap when the distance is less than or equal to 0; and
   determining that the virtual mapping object and the real object do not overlap when the distance is greater than 0.

6. The interaction method of claim 1, further comprising further determining whether the virtual mapping object and the real object overlap while running a preset application program.

7. The interaction method of claim 1, further comprising outputting, in response to the virtual mapping object and the real object overlapping, second prompt information indicating either turning to a first direction or moving to a first location.

8. The interaction method of claim 1, further comprising outputting, in response to the virtual mapping object and the real object overlapping, third prompt information instructing the user to trigger, after turning to a second direction or moving to a second location, the electronic device to display the virtual object again.

9. The interaction method of claim 1, further comprising further displaying the virtual object on a display screen of the electronic device.

10. The interaction method of claim 1, further comprising projecting an optical signal corresponding to the virtual object using an optical display device of the electronic device.

11. The interaction method of claim 1, further comprising further determining, based on first spatial information of the virtual object and second spatial information of the real object, whether the virtual mapping object and the real object overlap.

12. An electronic device comprising:
   at least one processor; and
   at least one memory configured to store instructions that when executed by the at least one processor cause the electronic device to:
      display to a user a virtual object on a display screen configured to provide a virtual reality scenario;
      map the virtual object to a real environment to obtain a virtual mapping object, wherein, based on the virtual reality scenario, the real environment is not displayed on the display screen and the user cannot see the real environment;
      determine whether the virtual mapping object and a real object overlap, wherein the real environment comprises the real object, and wherein the real object is not displayed with the virtual mapping object on the display screen; and
      in response to the virtual mapping object and the real object overlapping:

output first prompt information indicating that the virtual mapping object and the real object, which is not displayed on the display screen, overlap;
continue displaying the virtual object; and
stop detecting an operation that acts on an overlapping area of the virtual mapping object and the real object or skip responding to the operation.

13. The electronic device of claim 12, wherein the first prompt information further indicates the overlapping area.

14. The electronic device of claim 12, wherein the first prompt information comprises one or more of a visual element, a voice, an indicator feedback, or a vibration feedback.

15. The electronic device of claim 12, wherein when executed by the at least one processor, the instructions further cause the electronic device to display the overlapping area in a preset effect.

16. The electronic device of claim 12, wherein when executed by the at least one processor, the instructions further cause the electronic device to determine whether the virtual mapping object and the real object overlap while running a preset application program.

17. The electronic device of claim 12, wherein the electronic device is mounted on a head of the user, and wherein when executed by the at least one processor, the instructions further cause the electronic device to output, in response to the virtual mapping object and the real object overlapping, second prompt information instructing the user to turn to a first direction or to move to a first location.

18. The electronic device of claim 12, wherein the electronic device is mounted on a head of the user, and wherein when executed by the at least one processor, the instructions further cause the electronic device to output, in response to the virtual mapping object and the real object overlapping, third prompt information instructing the user to trigger, after turning to a second direction or moving to a second location, the electronic device to display the virtual object again.

19. The electronic device of claim 12, wherein the electronic device comprises a display screen and an optical display device, and wherein when executed by the at least one processor, the instructions further cause the electronic device to:
display the virtual object on the display screen; or
project an optical signal corresponding to the virtual object using the optical display device.

20. A computer program product comprising computer-executable instructions that are stored on a non-transitory computer-readable medium and that, when executed by a processor, cause an apparatus to:
display to a user a virtual object on a display screen configured to provide a virtual reality scenario;
map the virtual object to a real environment to obtain a virtual mapping object, wherein, based on the virtual reality scenario, the real environment is not displayed on the display screen and the user cannot see the real environment;
determine whether the virtual mapping object and a real object overlap, wherein the real environment comprises the real object, and wherein the real object is not displayed with the virtual mapping object on the display screen; and
in response to the virtual mapping object and the real object overlapping:
output first prompt information indicating that the virtual mapping object and the real object, which is not displayed on the display screen, overlap;
continue displaying the virtual object; and
stop detecting an operation that acts on an overlapping area of the virtual mapping object and the real object or skip responding to the operation when detecting the operation.

* * * * *